(12) United States Patent
Jones et al.

(10) Patent No.: US 7,464,104 B2
(45) Date of Patent: Dec. 9, 2008

(54) METHOD AND COMPUTER-READABLE MEDIUM FOR LOADING THE CONTENTS OF A DATA FILE

(75) Inventors: Brian M. Jones, Redmond, WA (US); Carol L. Liu, Sammamish, WA (US); Chad B. Rothschiller, Edmonds, WA (US); Robert R. McCaughey, Sammamish, WA (US); Shawn A. Villaron, San Jose, CA (US); Su-Piao B. Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/018,914

(22) Filed: Dec. 20, 2004

(65) Prior Publication Data

US 2006/0136476 A1     Jun. 22, 2006

(51) Int. Cl.
*G06F 17/30* (2006.01)
*G06F 15/16* (2006.01)
*G06F 11/00* (2006.01)

(52) U.S. Cl. ............... 707/102; 707/10; 707/205; 709/201; 714/15

(58) Field of Classification Search ............... 707/9, 707/10, 102, 201, 202, 205; 714/6, 15; 709/201; 711/111, 162
See application file for complete search history.

(56) References Cited

U.S. PATENT DOCUMENTS

| | | | |
|---|---|---|---|
| 5,491,808 A * | 2/1996 | Geist, Jr. ............... | 707/205 |
| 5,813,009 A | 9/1998 | Johnson et al. | |
| 6,243,831 B1 | 6/2001 | Mustafa et al. | |
| 6,567,826 B1 * | 5/2003 | Fischer et al. ............... | 707/202 |
| 6,606,694 B2 * | 8/2003 | Carteau ............... | 707/204 |
| 6,816,984 B1 | 11/2004 | Snyder et al. ............... | 714/38 |
| 7,020,742 B2 * | 3/2006 | Beeston et al. ............... | 707/5 |
| 7,337,358 B2 | 2/2008 | Jones et al. ............... | 714/15 |
| 7,346,265 B2 * | 3/2008 | Takigawa et al. ............... | 386/94 |
| 2003/0135478 A1 * | 7/2003 | Marshall et al. ............... | 707/1 |
| 2008/0126447 A1 | 5/2008 | Jones et al. ............... | 707/204 |

FOREIGN PATENT DOCUMENTS

| | | |
|---|---|---|
| EP | 1 093 063 A2 | 4/2001 |
| WO | WO 02/19075 A2 | 3/2002 |

OTHER PUBLICATIONS

Copending U.S. Appl. No. 12/021,770, filed Jan. 29, 2008 entitled "Method and Computer-Readable Medium for Verifying and Saving an Electronic Document".
European Search Report dated Feb. 17, 2006 cited in EP Application No. 05 11 1406.4.
European Search Report dated Feb. 17, 2006.
Chinese Official Action dated May 23, 2008 cited in Application No. 200510126788.1.
U.S. Appl. No. 12/021,770 filed on Jan. 29, 2008 entitled "Method and Computer-Readable Medium for Verifying and Saving an Electronic Document".

* cited by examiner

*Primary Examiner*—Shahid A Alam
(74) *Attorney, Agent, or Firm*—Merchant & Gould

(57) ABSTRACT

A method and computer-readable medium are provided for loading the contents of an electronic data file. According to the method, corrupted portions of a data file are identified and an attempt is made to repair these portions. If the corrupted portions cannot be repaired, the loading of these portions is skipped. The uncorrupted and repaired portions of the data file are then loaded into memory. If portions of the data file cannot be repaired or skipped, an attempt is made to load only the user data contained in the data file. In this manner, the user data contained in the data file may be loaded even in cases of severe corruption.

15 Claims, 4 Drawing Sheets

METHOD AND COMPUTER-READABLE MEDIUM FOR LOADING THE CONTENTS OF A DATA FILE

CROSS-REFERENCE TO RELATED APPLICATIONS

This application is related to concurrently filed U.S. patent application Ser. No. 11/018,916, which is entitled "Method and Computer-Readable Medium For Verifying and Saving an Electronic Document," which is expressly incorporated herein by reference.

BACKGROUND OF THE INVENTION

Computers are utilized pervasively in today's society to perform a wide variety of tasks and for entertainment purposes. For instance, computers today are utilized for gaming, communications, research, and a virtually endless variety of other applications. One of the most common uses of computers, by both businesses and individuals alike, is the creation of electronic and printed documents. Computer application programs exist for creating all kinds of electronic documents, including spreadsheets, presentations, word processing documents, graphical documents such as diagrams and digital images, computer-aided design documents, and many other types of electronic documents.

Electronic documents often include content that is very important. Moreover, the content of an electronic document in many cases would be difficult or impossible to recreate if lost. For instance, highly complicated legal, business, marketing, and technical documents are often created that could not easily be recreated if the data file storing the document were corrupted or destroyed. Even in cases where the contents of a document could be easily be recreated, it can be very frustrating for a user to lose even a small portion of their data. Accordingly, it is very important that the data contained in electronic documents be protected against destruction and corruption.

Modern computer systems include error checking and other mechanisms to protect against the inadvertent destruction or corruption of data files. Unfortunately, even with these mechanisms in place, it is quite common for the data files in which electronic documents are stored to become corrupted. Corruption may occur while the data file is being saved to mass storage or may occur as a result of a faulty storage device or controller hardware. Data files may also become corrupted during network transmission or by the occurrence of many other types of events. Because the loss of any amount of data can be frustrating to a user and because the time and effort necessary to recreate a corrupted document is often very high, it is important that as much data as possible be recovered from a corrupted data file.

It is with respect to these considerations and others that the various embodiments of the present invention have been made.

BRIEF SUMMARY OF THE INVENTION

In accordance with the present invention, the above and other problems are solved by a method and computer-readable medium for loading the contents of an electronic data file. Through the use of the various embodiments of the present invention, during the load of a data file corrupted portions, or records, of the file are identified and an attempt is made to repair these portions. If the corrupted portions cannot be repaired, the loading of these portions is skipped. The uncorrupted and repaired portions of the data file are then loaded into memory. If portions of the data file cannot be repaired or skipped, an attempt can also be made to load only the user data contained in the data file. In this manner, the user data contained in the data file may be loaded even in cases of severe corruption to the remainder of the data file.

According to one aspect of the invention, a method is provided for loading a data file that includes one or more portions. According to the method, a number of load modes are provided. In the "normal" load mode an attempt is made to load each portion of the data file in a normal fashion. The normal load mode includes minimal integrity checking on each of the portions of the data file so that the file can be loaded quickly. If a portion of the data file is encountered that is missing or corrupt while in the normal mode, a second mode, called the "safe" load mode, is utilized to attempt to load the portions of the data file. A portion of the data file may be considered corrupt and therefore unloadable if it causes an error in or crash of the application program attempting to load it, if the portion includes an unexpected data value, if the portion is missing data, if the portion includes invalid records or invalid extensible markup language ("XML"), and for other causes.

In the safe load mode extensive integrity checking is performed on each portion of the data file. In the safe load mode an attempt may also be made to repair the corrupted portions of the data file. Any portions that can be repaired are then loaded. If a portion of the data file is encountered in the safe load mode that is missing or corrupt and which is also unrepairable, the loading of the unrepairable portion is skipped. If portions of the data file are encountered that are not repairable and for which loading cannot be skipped, a third load mode, called the "recovery" load mode, is utilized to attempt to load the portions of the data file.

In the recovery load mode only the portions of the data file that include user data are loaded. For instance, user data may comprise text data or numerical data that was entered by a user. As an example, if the data file contains a spreadsheet, an attempt is made in the recovery load mode to load only the data contained in the cells of the spreadsheet. No attempt is made in the recovery mode to load other types of data that may be contained in the data file, such as pivot tables, list objects, named ranges, auto filters, styles, formatting, and application or user preferences.

According to other embodiments of the invention, a computer-readable medium is also provided on which is stored computer-executable instructions. When the computer-executable instructions are executed by a computer, they cause the computer to provide a first loading mode for loading a data file that has one or more portions. In the first loading mode minimal integrity checking is performed on the portions of the data file as they are loaded. The computer-executable instructions also cause the computer to provide a second loading mode for loading the data file in which more extensive integrity checking is performed on the portions of the data file than in the first loading mode. In the second loading mode an attempt may also be made to repair portions that are unloadable. Moreover, in the second loading mode the loading of any unloadable portions is skipped.

The computer-executable instructions also cause the computer to begin loading a data file in the first loading mode. If a portion of the data file is determined to be unloadable in the first loading mode, the computer switches to the second loading mode and attempts to load the data file in this loading mode. If, in the second loading mode, an unloadable portion is encountered that may be repaired, the unloadable portion is repaired and loaded. If the unloadable portion cannot be repaired, loading of the unloadable portion is skipped.

According to an embodiment of the invention, the computer-executable instructions also cause the computer to provide a third loading mode wherein only the portions of the data file that include user data are loaded. If, in the second loading mode, it is determined that a portion of the data file is unloadable and that the unloadable portion cannot be repaired or skipped, an attempt is made to load the contents of the data file in the third loading mode.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
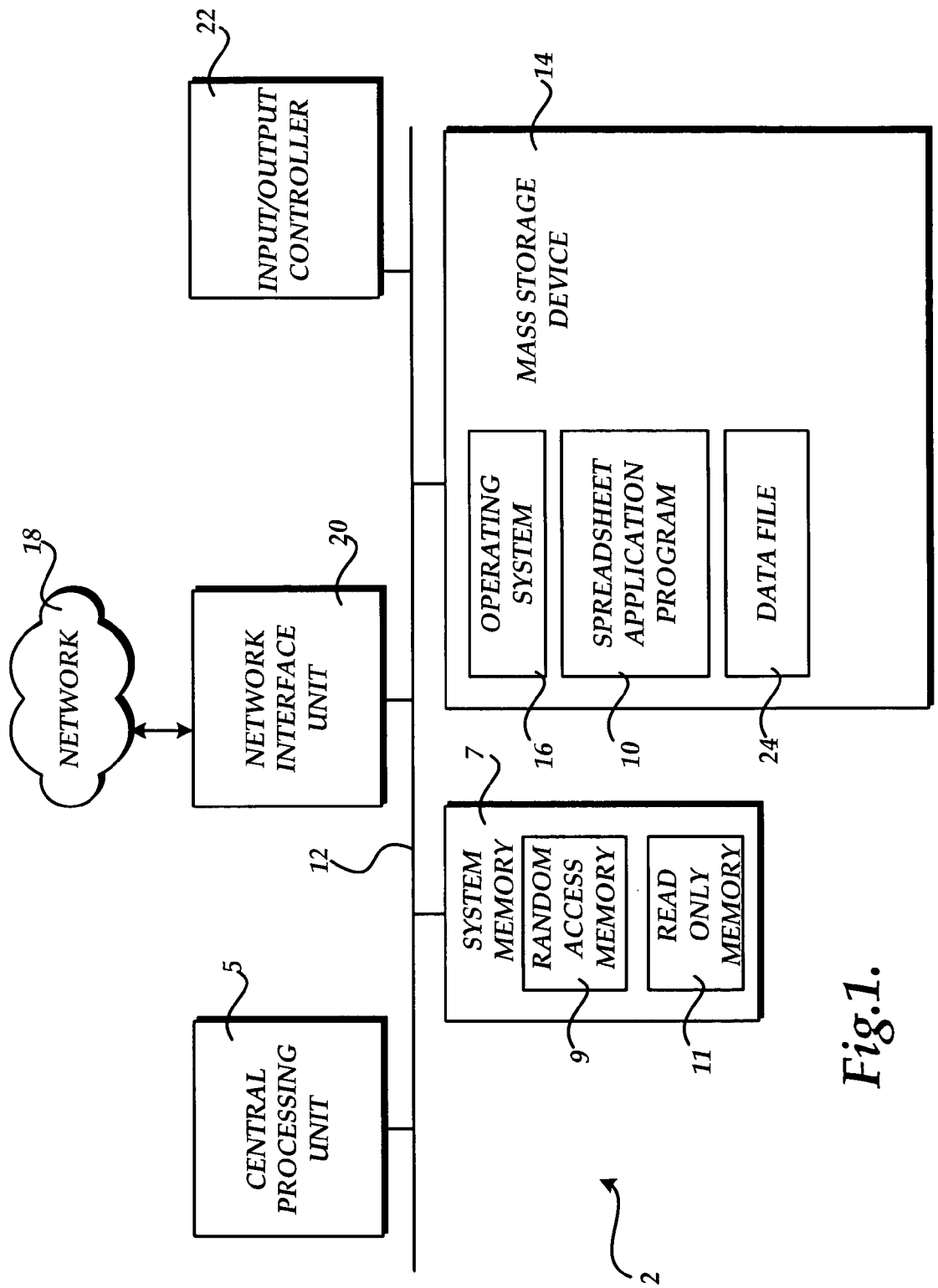
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a spreadsheet application program 10. As known to those skilled in the art, the spreadsheet application program 10 is operative to provide functionality for creating and editing electronic spreadsheets.

According to one embodiment of the invention, the spreadsheet application program 10 comprises the EXCEL spreadsheet application program from MICROSOFT CORPORATION. It should be appreciated, however, that other spreadsheet application programs from other manufacturers may be utilized to embody the various aspects of the present invention. It should also be appreciated that although the embodiments of the invention described herein are presented in the context of a spreadsheet application program, the invention may be utilized with any other type of application program that loads data from a data file. For instance, the embodiments of the invention described herein may be utilized within a word processing application program, a presentation application program, a drawing or computer-aided design application program, or a database application program.

In conjunction with the creation and editing of a spreadsheet document, the spreadsheet application program 10 provides functionality for saving the spreadsheet document in a data file 24 on the mass storage device 14. The data file 24 contains data representing the various aspects of a spreadsheet document, such as user data including the contents of the spreadsheet cells, application preferences, formatting information, and other data corresponding to the various features provided by the spreadsheet application program 10. Additional details regarding the structure of the data file 24 will be provided below with respect to FIG. 2.

According to the embodiments of the invention, the spreadsheet application program 10 provides functionality for restoring the contents of a spreadsheet document by loading the data file 24 from the mass storage device 14 into the random access memory 9 of the computer 2. As will be described in greater detail below with respect to FIGS. 2-3B, a method for loading the data file 24 is utilized by the spreadsheet application program 10 that accounts for the possibility of corruption in the data file 24 and that attempts to maximize the amount of data that is loaded from the data file 24 even if the data file 24 becomes corrupted.

Figure 2:
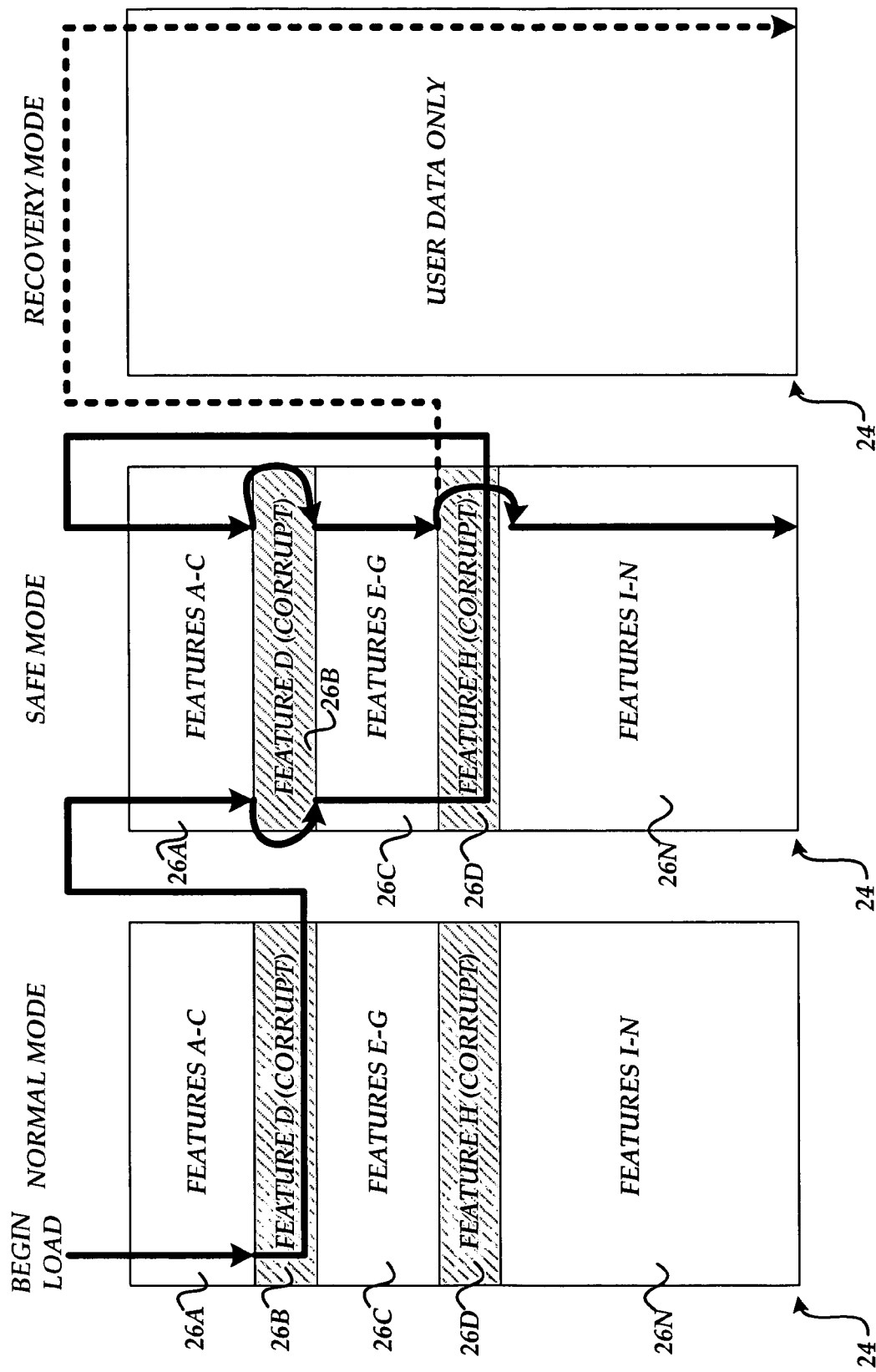
FIG. 2 is a block diagram illustrating aspects of a data file and the various loading modes provided by the embodiments of the invention.

Turning now to FIG. 2, additional details will be provided regarding the structure of the data file 24 and the operation of the loading mechanism utilized by the spreadsheet application program 10. As shown in FIG. 2, the data file 24 is subdivided into a number of portions 26A-26N. Each of the portions 26A-26N is utilized to store information relating to one or more features supported by the spreadsheet application program 10. Moreover, the information for different but related features may be stored in a single one of the portions 26A-26N. For instance, as shown in FIG. 2, the data for features A-C are stored in the portion 26A. The data for feature D is stored in portion 26B. The data for features E-G are stored in the portion 26C, and so on. User data may be stored in any of the portions 26A-26N.

As described briefly above, and shown in FIG. 2, it is possible for the data contained within the portions 26A-26N to be corrupted. Corruption may occur while the data file is being saved to mass storage or may occur as a result of a faulty storage device or controller hardware. Data files may also become corrupted during network transmission or by the occurrence of many other types of events. The data for a particular portion may also be determined to be missing. A portion of the data file may be considered corrupt and therefore unloadable if it causes an error in or crash of the application program attempting to load it, if the portion includes an unexpected data value, if the portion is missing data, if the portion includes invalid records or invalid extensible markup language ("XML"), and for other causes. In the illustrative data file 24 shown in FIG. 2, the portions 26B and 26D have become corrupted.

As described herein, portions of the data file 24 are loadable by the spreadsheet application program 10 despite the corruption of the portions 26B and 26D. FIG. 2 also illustrates this loading process utilizing the illustrative data file 24. In particular, the spreadsheet application program 10 begins loading the data file 24 in a normal loading mode. In the normal loading mode, minimal integrity checking is performed on the portions 26A-26N of the data file. If a corrupted portion of the data file 24 is encountered while loading in the normal mode, the spreadsheet application program 10 switches to a safe loading mode and begins loading the data file 24 from the beginning. For instance, as shown in FIG. 2, when the corrupted portion 26B is encountered in the normal loading mode, the loading mode is changed to the safe loading mode and loading begins again at the beginning of the data file 24.

In the safe loading mode, additional integrity checking is performed on the portions 26A-26N of the data file 24 as compared to the normal loading mode. Additionally, if a corrupted portion is encountered while loading in the safe mode, an attempt is made to repair the corrupted portion. If the corrupted portion can be repaired, that portion is loaded. If the corrupted portion cannot be repaired, then the loading of the corrupted portion is skipped. For example, as shown in FIG. 2 the portion 26B is corrupted and cannot be repaired. Therefore, the loading of the portion 26B is skipped and the portion 26C is loaded.

After the portion 26C has been loaded, an attempt is then made to load the portion 26D. However, as shown in FIG. 2, the portion 26D is corrupt. Accordingly, an attempt is made to repair the portion 26D. If the portion 26D cannot be loaded, the loading of the portion 26D is skipped and this process continues until the remaining portions have been loaded or skipped. According to an embodiment of the invention, the loading of the data file 24 may return to the beginning of the data file 24 after an unloadable portion has been encountered and determined to be unrepairable. This is illustrated in FIG. 2. Returning to the beginning of the data file 24 in this manner allows the loading of other portions of the data file 24 that are related to an unloadable portion to be skipped even though the related portions may not be corrupt.

If, during the loading of the data file 24, a portion is encountered that is unloadable and unrepairable, the spreadsheet application program 10 may switch to a third loading mode, called the recovery loading mode. In the recovery loading mode, an attempt is made to load only the user data from the data file. In particular, with regard to a text document an attempt is made to load only the text of the document. With regard to a spreadsheet document, an attempt is made to load the contents of the spreadsheet cells, including data input by a user, formulas, and formula generated data. In this manner, even if portions of the data file are corrupt, some or all of the user data may be recovered and loaded. This process is illustrated by the dotted line in FIG. 2 and would be performed if the portion 26D was determined to be unloadable and unrepairable, and that the file should not be loaded at all without it. Additional details regarding this process are provided below with respect to FIGS. 3A-3B.

Figure 3A:
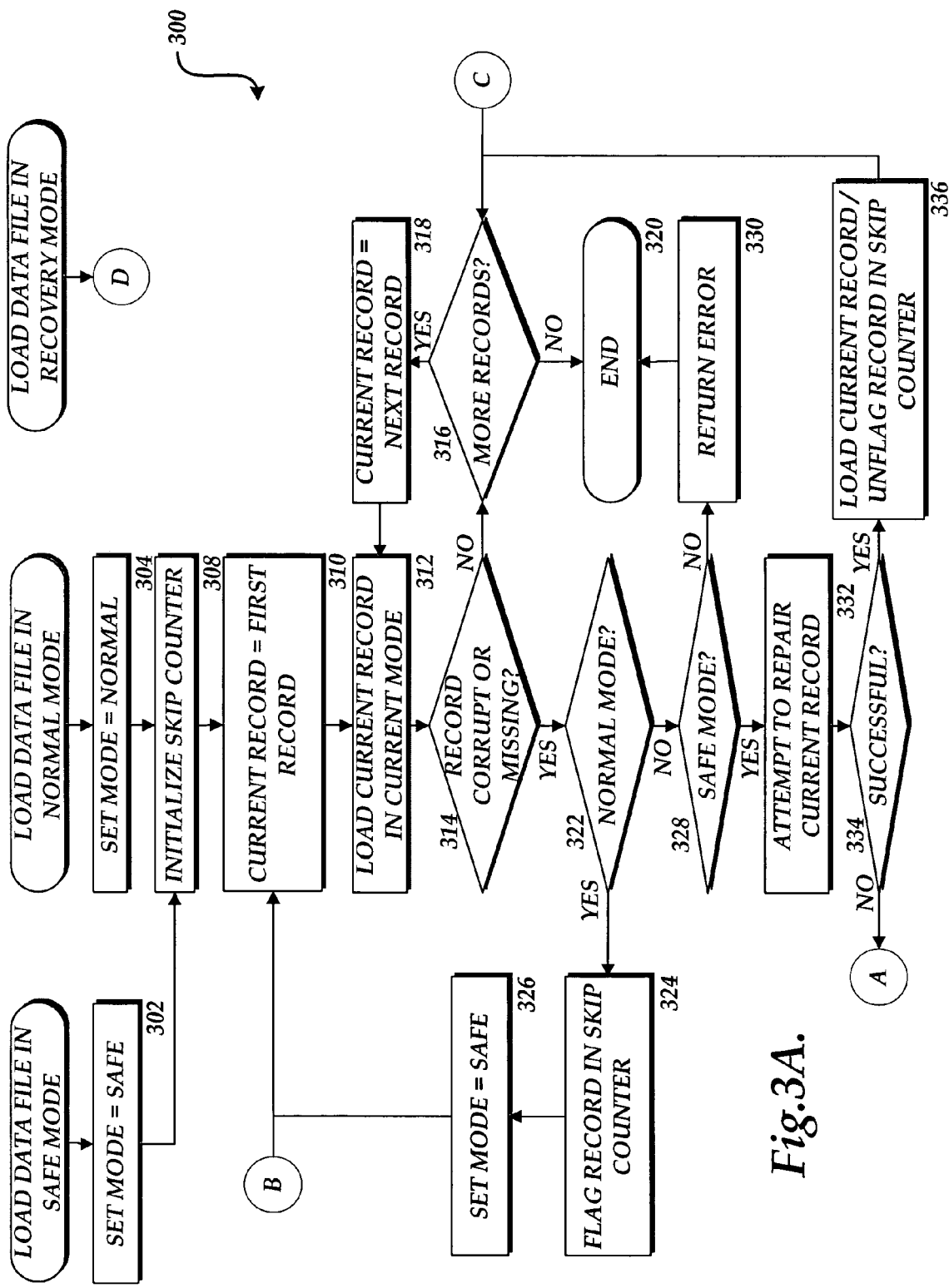
FIGS. 3A-3B are flow diagrams showing an illustrative process for loading a data file according to the various embodiments of the invention.
Figure 3B:
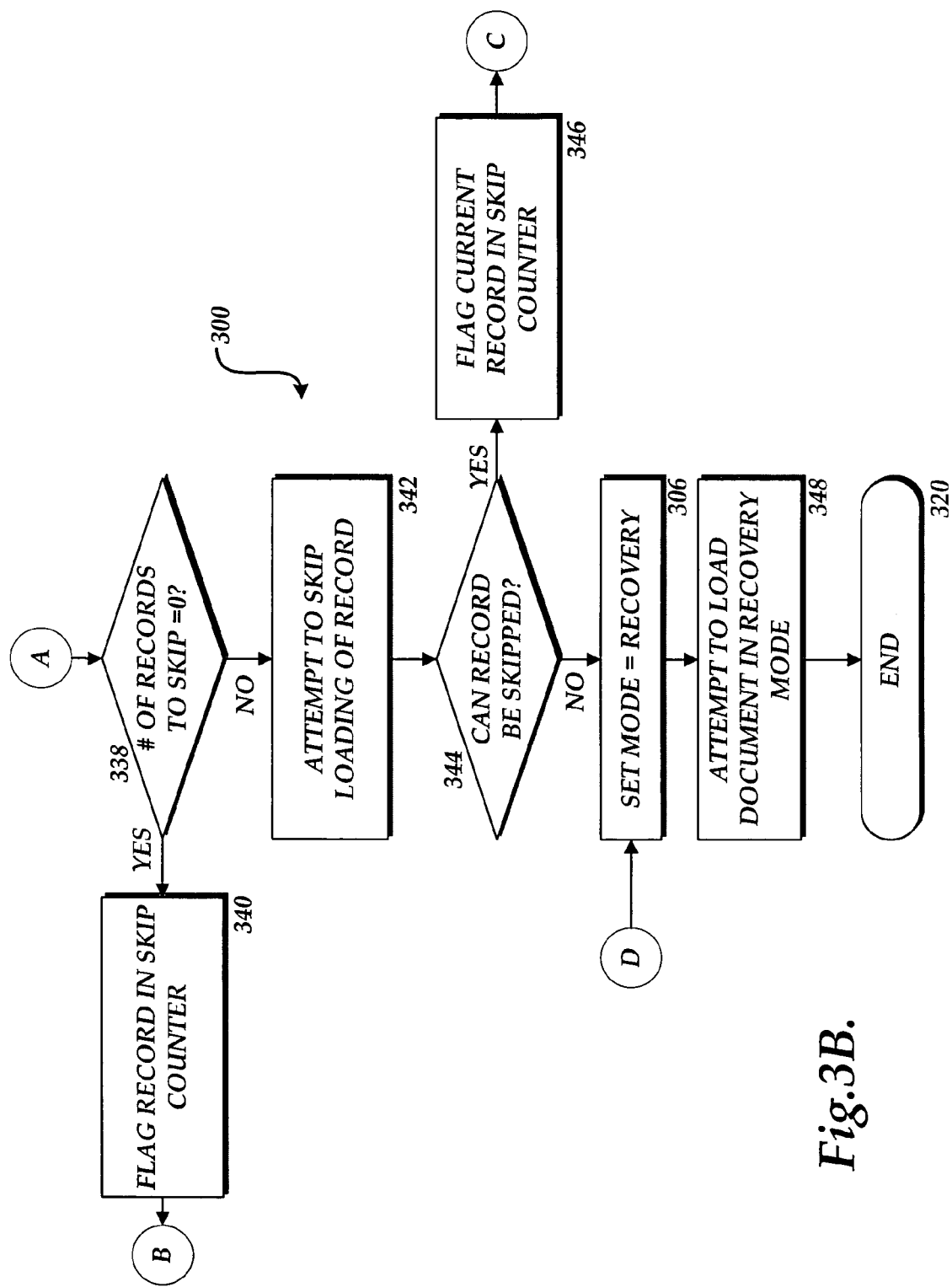

Referring now to FIGS. 3A-3B, the routine 300 will be described illustrating a process performed by the spreadsheet application program 10 for loading the contents of a data file 24. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3A-3B, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

It should be appreciated that the routine 300 utilizes several variables in its operation. In particular, the "mode" variable keeps track of the current loading mode. This variable may be set to either "safe," "normal," or "recovery." The "skip counter" variable is a data structure used to identify individually each of the portions that should be skipped during loading. A "number of records to skip" variable describes the current number of sections that should be skipped on the current load attempt. A "current record" variable identifies the current section within the data file being processed. It should be appreciated that more or fewer variables may be utilized to perform the same task. Moreover, it should be appreciated that the routine 300 illustrated in FIG. 3 represents but one possible implementation of the invention and that many other implementations will be apparent to those skilled in the art.

The routine 300 begins at either operation 302, 304, or 306. In particular, according to embodiments of the invention, a user interface may be provided that allows a user to select whether a data file is loaded normally (operation 304), is loaded in the safe loading mode (operation 302), or is loaded in the recovery loading mode (306). This user interface may be presented to a user when the user requests that a file be loaded. Based on the user's selection within the user interface, the routine 300 begins its operation at either operation 302, 304, or 306.

If loading is to begin in the safe loading mode, the routine 300 begins at operation 302, where the mode variable is set to "safe." The routine 300 then continues to operation 308. If loading is to begin in the normal loading mode, the routine 300 begins at operation 304, where the mode variable is set to "normal." The routine 300 then continues from operation 304 to operation 308. If loading is to begin in the recovery loading mode, the routine begins at operation 306, where the mode variable is set to "recovery." From operation 306, the routine 300 continues to operation 348, described below.

At operation 308, the skip counter variable is initialized to indicate that no records should be skipped. The routine 300 then continues to operation 310 where the current record is set to the first record in the data file. The number of records to skip variable is initialized as well. On the first pass, this sets the number of records to skip equal to zero. From operation 310, the routine 300 continues to operation 312.

At operation 312, an attempt is made to load the current record in the current mode. For instance, if the mode variable is equal to "normal," minimal integrity checking is performed on the section being loaded. If the mode variable is equal to "safe," additional integrity checking is performed. From operation 312, the routine 300 continues to operation 314, where a determination is made as to whether the current record is unloadable (i.e. either corrupt or missing). If the current record is loadable, the routine 300 branches to operation 316 where a determination is made as to whether more records remain to be loaded. If more records exist, the routine 300 branches from operation 316 to operation 318 where the current record variable is set to the next record in the data file. The routine 300 then continues to operation 321, where the next record is loaded. If, at operation 316, it is determined that no additional records remain to be loaded, the routine 300 branches to operation 320 where it ends. In this manner, all records are loaded in the current mode if no corrupt or missing records exist.

It should be appreciated that, in embodiments of the invention, some integrity checks may be performed at the feature level as opposed to the record level. To perform such feature level integrity checking, all of the records for a particular feature are loaded. Then, a determination is made as to whether the data for the feature is valid. If the data is invalid, the skip data structure is updated with the records for the feature to be skipped and the file is reloaded. File-level consistency checks may also be made in a similar manner.

If, at operation 314, it is determined that the current record is unloadable, the routine 314 continues to operation 322 where a determination is made as to whether the current mode is the normal mode. If the current mode is the normal mode, the routine 300 branches to operation 324, where the record is flagged in the skip counter variable indicating that a portion of the data file has been identified that may need to be skipped. The routine 300 then continues to operation 326, where the mode variable is set to "safe." In this manner, the loading mode is switched from normal to safe upon encountering an unloadable portion of the data file. The routine 300 then returns back to operation 310, where the processing the of the data file returns to the beginning.

If, at operation 322, it is determined that the current loading mode is not the normal mode, the routine 300 continues to operation 328 where a determination is made as to whether the current loading mode is the safe mode. Because only the normal or safe loading modes should be possible values in this portion of the routine 300, the routine branches to operation 330 where an error is returned if the current loading mode is not the safe mode. The routine 300 then continues from operation 330 to operation 320, where it ends. If, however, at operation 328 it is determined that the current mode is the safe mode, the routine 300 continues to operation 332.

At operation 332, an attempt is made to repair the current record. At operation 334, a determination is made as to whether the current record was repairable. If the record was repairable, the routine 300 branches to operation 336, where the current record is loaded. At operation 336, the skip counter variable is also updated to indicate that loading of the current record should not be skipped because the record was repairable. From operation 336, the routine 300 branches back to operation 316, where the remainder of the records of the data file are processed in the manner described above.

If, at operation 334, it is determined that the current record could not be repaired, the routine 300 branches to operation 338. At operation 338, a determination is made as to whether the number of records to skip is equal to zero. This would be the case where loading was started in the normal mode and where the first corrupt record was encountered and the record is unrepairable. In this case, the routine 300 branches to operation 340, where the skip counter variable is updated to indicate that the record should be skipped. The routine 300 then returns to operation 310, where processing of the data file returns to the beginning in the manner described above.

If, at operation 338, it is determined that the number of records to skip is not equal to zero, the routine 300 continues to operation 342, where an attempt is made to skip the loading of the current record. At operation 344 a determination is made as to whether the loading of the current record may be skipped. If loading of the current record can be skipped, the routine 300 branches to operation 346 where the record is flagged in the skip record variable. The routine then continues to operation 316, described above.

If, at operation 344, it is determined that the current record cannot be skipped, the routine 300 continues to operation 306 where the mode variable is set to "recovery." The routine 300 then continues to operation 348, where an attempt is made to load the data file in the recovery mode. As described above, only user data is loaded in the recovery mode. Moreover, an attempt is made to load as much of the user data as possible if the user data also is corrupted. The routine 300 then continues to operation 320, where it ends.

Based on the foregoing, it should be appreciated that the various embodiments of the invention include a method, system, apparatus, and computer-readable medium for loading the contents of a data file. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for loading a data file including at least one portion, the method comprising:
    attempting to load the at least one portion of the data file in a first mode, wherein attempting to load the at least one portion comprises;
        initializing a skip counter to identify each of the at least one portions that can be skipped, and
        performing integrity checking on each of the at least one portions;
    determining in the first mode whether a portion of the at least one portion is unloadable, wherein determining in the first mode whether the portion of the at least one portion is unloadable comprises determining whether a current mode is at least one of the following: normal mode and safe mode; and
    in response to determining that the portion of the at least one portion is unloadable,
        flagging the skip counter to indicate that the unloadable portion can be skipped,
        switching to a second loading mode, and
        attempting to load the data file in the second mode wherein additional integrity checking is performed on each of the at least one portions, wherein loading of each unloadable portion and loading of each portion related to each unloadable portion are skipped, wherein while attempting to load the data file in the second mode determining whether the unloadable portion may be repaired, and in response to determining that the unloadable portion may be repaired, repairing the unloadable portion, unflagging the skip counter, and loading a repaired portion.

2. The method of claim 1, further comprising in response to determining that the unloadable portion may not be repaired, skipping the loading of the unloadable portion.

3. The method of claim 2, further comprising:
    determining whether the loading of the unloadable portion may be skipped; and
    in response to determining that the loading of the unloadable portion cannot be skipped, attempting to load the data file in a third mode, wherein in the third mode only portions of the data file corresponding to user data are loaded.

4. The method of claim 3, wherein the user data comprises text data entered by a user.

5. The method of claim 3, wherein the user data comprises numerical data entered by a user.

6. A computer-readable storage medium having computer-executable instructions stored thereon which, when executed by a computer, will cause the computer to:
    provide a first loading mode for loading a data file having at least one portion, wherein providing the first loading mode, initialize a skip counter to identify each of the at least one portion that can be skipped and wherein integrity checking is performed on each of the at least one portions when loading in the first loading mode;
    provide a second loading mode for loading the at least one portion of the data file, wherein additional integrity checking is performed on each of the at least one portions and wherein loading of each unloadable portion, and loading of each portion related to an unloadable portion are skipped;
    begin loading the data file in the first loading mode, wherein while loading the data file, determine whether a current mode is at least one of the following: normal mode and safe mode;
    determine when operating in the first loading mode whether a portion of the data file is unloadable and in response to determining that the portion is unloadable, flag the skip counter to indicate that the unloadable portion can be skipped and switch to the second loading mode; and to
    attempt to load the data file in the second mode, wherein while attempting to load the data file in the second mode, determine whether the unloadable portion may be repaired, and in response to determining that the unloadable portion may be repaired, repair the unloadable portion, unflag the skip counter, and load the repaired portion.

7. The computer-readable storage medium of claim 6, wherein in the second loading mode the loading of the unloadable portion is skipped in response to determining that an unloadable portion may not be repaired.

8. The computer-readable storage medium of claim 7 comprising further computer-readable instructions which, when executed by the computer, cause the computer to:
    provide a third loading mode wherein in the third mode only portions of the data file corresponding to user data are loaded;
    to determine while operating in the second loading mode whether the loading of an unloadable portion may be skipped; and
    in response to determining that the loading of an unloadable portion cannot be skipped, switching to the third loading mode.

9. The computer-readable storage medium of claim 8, wherein the user data comprises text data entered by a user.

10. The computer-readable storage medium of claim 9, wherein the user data comprises numerical data entered by a user.

11. A method for loading a data file including at least one record, the method comprising;
    selecting a load mode by a user;
    initializing a skip counter indicating that no records can be skipped;
    initializing a number of records to be skipped counter indicating the number of records to be skipped;
    loading the data file in a first mode, wherein loading the data file comprises performing integrity checking on each of the at least one record;
    determining in the first mode whether a record of the data file is unloadable;
    in response to determining that the record of the data file is unloadable, determining in the first mode whether a current mode is a normal mode, wherein flagging the skip counter to indicate that the unloadable record can be skipped and switching the current mode to a safe mode wherein loading the data file from the beginning;

in response to determining in the first mode that the current mode is not the normal mode, determining whether the current mode is the safe mode, wherein returning an error if the current loading mode in not the safe mode;

attempting to load the data file in a second mode, wherein while attempting to load the data file in the second mode, determining whether to repair the unloadable record;

in response to determining whether to repair the unloadable record, unflagging the skip counter and loading the record if the record is repaired and determining the number of records to be skipped when the record is not repaired; and wherein in response to determining that the number of records to be skipped, flagging the skip counter if the records to be skipped is equal to zero and attempting to skip loading of the record if the number of records to be skipped is not equal to zero.

12. The method of claim 11, further comprising in response to determining that an unloadable record may not be repaired, skipping the loading of the unloadable record.

13. The method of claim 12, further comprising:
determining whether the loading of an unloadable record may be skipped; and
in response to determining that the loading of an unloadable record cannot be skipped, attempting to load the data file in a third mode, wherein in the third mode only record of the data file corresponding to user data are loaded.

14. The method of claim 13, wherein the user data comprises text data entered by a user.

15. The method of claim 13, wherein the user data comprises numerical data entered by a user.

* * * * *